US 8,458,726 B2

(12) United States Patent
Zimmer et al.

(10) Patent No.: US 8,458,726 B2
(45) Date of Patent: Jun. 4, 2013

(54) BIOS ROUTINE AVOIDANCE

(75) Inventors: Vincent J. Zimmer, Federal Way, WA (US); Jiewen Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1020 days.

(21) Appl. No.: 11/949,317

(22) Filed: Dec. 3, 2007

(65) Prior Publication Data
US 2009/0144754 A1   Jun. 4, 2009

(51) Int. Cl.
G06F 3/00   (2006.01)

(52) U.S. Cl.
USPC .......................................................... 719/318

(58) Field of Classification Search
None
See application file for complete search history.

(56) References Cited

U.S. PATENT DOCUMENTS

| 6,081,890 | A | * | 6/2000 | Datta | 713/1 |
| 7,478,388 | B1 | * | 1/2009 | Chen et al. | 718/1 |
| 2005/0114639 | A1 | * | 5/2005 | Zimmer | 712/244 |
| 2005/0177710 | A1 | * | 8/2005 | Rothman et al. | 713/2 |
| 2006/0129795 | A1 | * | 6/2006 | Bulusu et al. | 713/2 |

* cited by examiner

Primary Examiner — H. S. Sough
Assistant Examiner — Carina Yun
(74) Attorney, Agent, or Firm — Trop, Pruner & Hu, P.C.

(57) ABSTRACT

A method, computer readable medium, and device are disclosed. In one embodiment the method includes determining whether an entry exists in a firmware interface table to direct the processor to handle the event in a non-legacy mode. This is done after an event for a processor that triggers a legacy mode processor handling routine. The method also includes the processor handling the event in the non-legacy mode when the entry exists.

20 Claims, 4 Drawing Sheets

BIOS ROUTINE AVOIDANCE

FIELD OF THE INVENTION

The invention relates to handling processor events in non-legacy modes.

BACKGROUND OF THE INVENTION

Modern operating systems, such as 64-bit long mode (x64) Microsoft® Vista®, do not require any real-mode code flows. Real-mode refers to a 16-bit execution environment that operates the computer system in a limited 1 MB (megabyte) memory space. The last OS-visible 16-bit execution environments were 16-bit DOS (disk operating system) and WIN16. These old environments have been deprecated from x64 Vista. The firmware space is facing a similar migration. Modern firmware architectures like the Unified Extensible Firmware Interface (UEFI)-based BIOS, including constructions based upon the Platform Environment Initialization (PEI) and Driver Execution Environment (DXE) portions of the Platform Initialization (PI) Architecture, can run completely in 64-bit long-mode. In other words, the pre-OS environment, the environment that operates a computer before the machine is handed over to the OS, also no longer needs real-mode. 16-bit assemblers and compilers are becoming rare as well.

This software migration compares to the venerable x86 architecture, which still hands-off control to the machine from a restart in 16-bit real mode using the architecturally-required reset vector at the top of 32-bit memory space. x86 architecture also requires a startup inter-processor interrupt (IPI) to be located below 1 MB in memory with a 16-bit code entry point (startup IPI). Additionally, x86 architecture also delivers System Management Mode Interrupts (SMI) in 16-bit real mode, namely System management mode (SMM) entries. These 3 machine state transitions require real-mode execution, which require a significant amount of transistors in the processor to handle, and they also require a specific memory map (i.e. memory locations at less than 1 MB are still required because of startup IPI).

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method, computer readable medium, and device to avoid real-mode BIOS routines are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
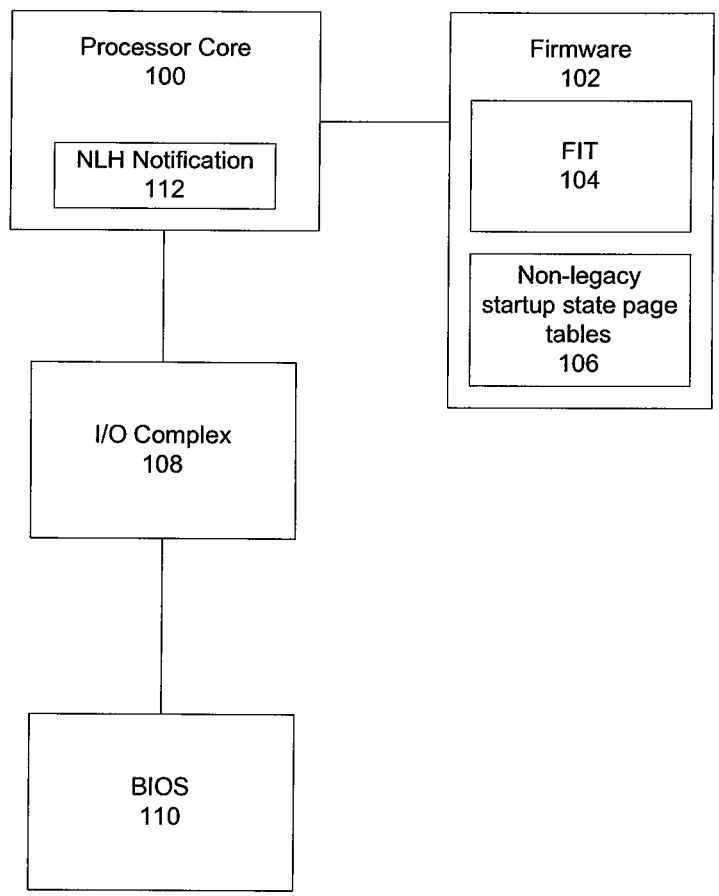
FIG. 1 describes one embodiment of a device and system capable of avoiding legacy mode BIOS (basic input/output system) code flows.

FIG. 1 describes one embodiment of a device and system capable of avoiding legacy mode BIOS (basic input/output system) code flows. In many embodiments at least one processor core 100 is present. In other embodiments, multiple processor cores are present in the system (not shown). In yet other embodiments, multiple processors, each with single or multi-cores are present in the system (not shown). In embodiments where there are multiple cores and/or multiple processors in the system, a single master core is designated to perform boot and other such system handling processes in the system. Thus, in these embodiments, processor core 100 is the master core.

Processor core 100 is coupled to a firmware device 102. In many embodiments, firmware 102 is located in the same package as processor core 100. In other embodiments, firmware 102 is external to the processor package. In many embodiments, firmware 102 is a read only memory (ROM) device.

Firmware 102 includes a firmware interface table (FIT) 104 in many embodiments. The FIT 104 may include pointers to locations elsewhere within firmware 102 where segments of code (i.e. routines) are located that handle events in the system. The initial FIT pointer is designed such that startup microcode/hardware in the CPU can discover its location prior to accessing any other part of the flash boot ROM, including but not limited to third party macrocode at the reset vector. In many embodiments, a portion of firmware 102 includes a number of non-legacy startup state page tables 106 for x64 long-mode which requires have paging enabled; such tables are not required for the non-legacy 32-bit protected mode that can execute in physical mode (e.g., no need for virtual memory/page tables). The non-legacy startup state page tables 106 include routines that are launched at certain occasions to handle events and hand the system to an operating system in a non-legacy mode. The details regarding the items stored in firmware 102 are discussed below and shown in FIG. 2.

In many embodiments, legacy mode refers to 16-bit real mode. In many embodiments, a non-legacy mode may include any mode that is not 16-bit real mode. Thus, non-legacy modes can include 64-bit long mode or 32-bit protected mode, among other possible modes.

Processor core 102 is also coupled to I/O (input/output) complex 108 in many embodiments. I/O complex 108 may include one or more I/O host controllers that control one or more I/O interconnects (not shown). Additionally, although the coupling of I/O complex 108 to processor core 100 is shown as a single link (i.e. interconnect or bus), in many embodiments, this coupling may be accomplished over a series of links. For example, processor core 100 may be coupled over a first link to a memory complex (where the memory complex interfaces with a memory subsystem), and then the memory complex may be coupled to the I/O complex 108 over a second link. This extra system detail is not shown in FIG. 1.

Finally, I/O complex 108 is coupled a BIOS (basic input/output system) 110. BIOS 110 includes additional segments of code (i.e. routines) that perform general system setup during boot as well as during other times. BIOS 110 generally has one or more legacy routines that set the system up in 16-bit real mode prior to giving control to the operating system. Some of these routines include handlers for events such as a system reset, a system management interrupt, and an interprocessor interrupt in a multi-processor system.

Figure 2:
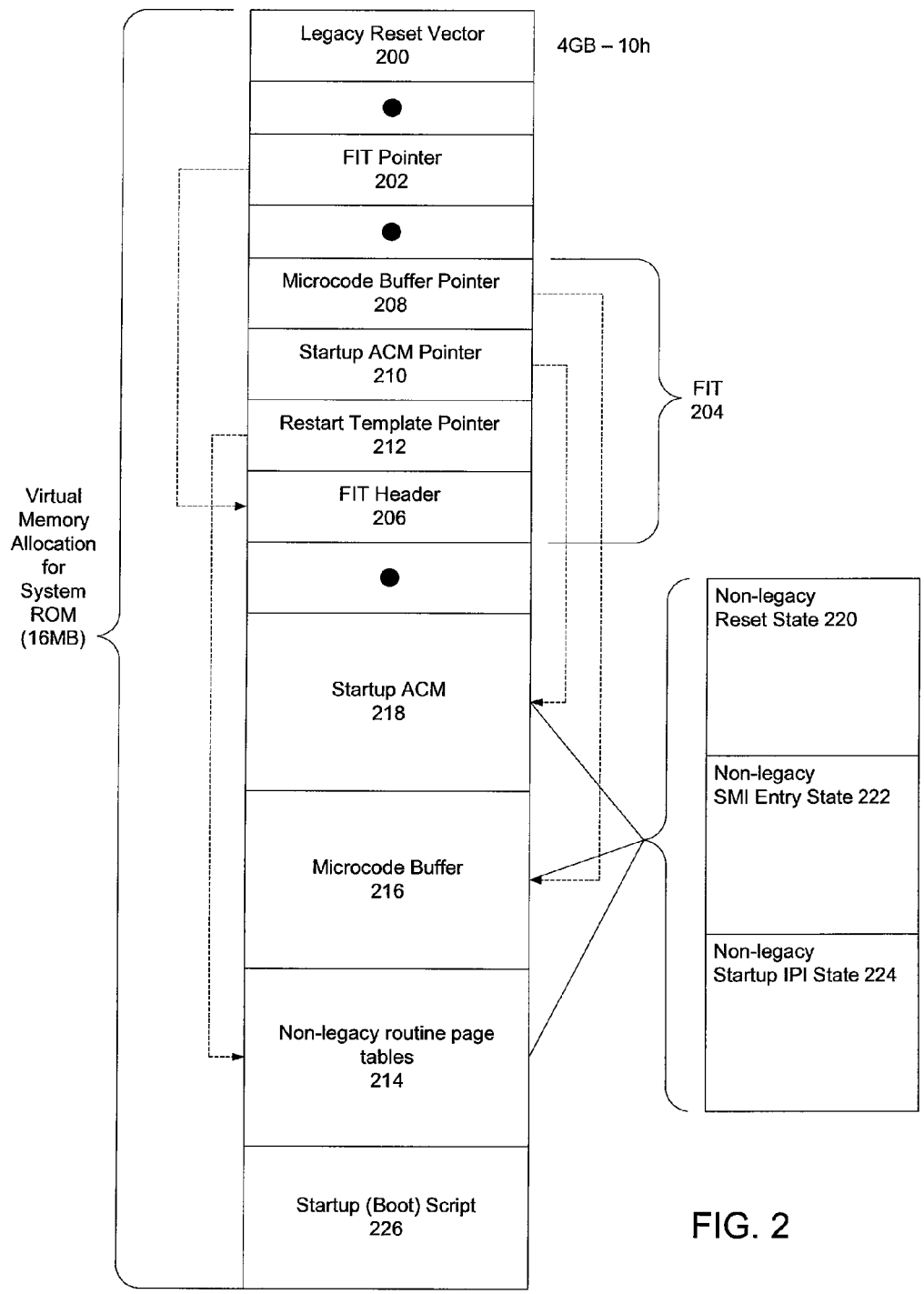
FIG. 2 describes one embodiment of the virtual memory allocation for the system ROM including non-legacy mode handler routines.

FIG. 2 describes one embodiment of the virtual memory allocation for the system ROM including non-legacy mode handler routines. In many embodiments, the system ROM (i.e. firmware 102) is given a 16 MB allocation at the top of 32-bit memory space. The very top of memory space, 4 GB (gigabyte)—10 h, contains the IA-32 (Intel® Architecture 32-bit) reset vector 200 for legacy compatibility.

In many embodiments, a FIT pointer 202 is located below the reset vector 200. The FIT pointer 202 points to the start of the FIT 204 located elsewhere in firmware 102. Both the reset vector 200 and the FIT pointer 202 are located in the protected boot block in firmware 102, which requires these locations to remain fixed. Thus, although the FIT pointer 202 cannot be moved, the location of the FIT 204 can be put at any memory location below the protected boot block.

In the embodiment shown in FIG. 2, the FIT pointer 202 points to the FIT header 206, located at the bottom of the FIT 204. The FIT header 206 is an architecturally required entry in the FIT 204. Elsewhere in the FIT there may be a microcode buffer pointer 208, a startup ACM (authenticated code module) pointer 210, a restart template pointer 212, among other possible pointers. Each pointer points to a specific location below the FIT 204. In many embodiments, the microcode buffer pointer 208 points to a microcode buffer 216, the startup ACM pointer 210 points to a startup ACM 218, and the restart template pointer 212 points to one or more page tables in the firmware 102 that include routines for a non-legacy mode startup state 214.

In some embodiments, a FIT entry may point to a startup script (or boot script) 226. A boot script is a set of binary operations, such as defined in the Intel® Platform Innovation Framework for EFI Boot Script Specification. The boot script may include operations such as the following:

| | |
|---|---|
| #define EFI_BOOT_SCRIPT_IO_WRITE_OPCODE | 0x00 |
| #define EFI_BOOT_SCRIPT_IO_READ_WRITE_OPCODE | 0x01 |
| #define EFI_BOOT_SCRIPT_MEM_WRITE_OPCODE | 0x02 |
| #define EFI_BOOT_SCRIPT_MEM_READ_WRITE_OPCODE | 0x03 |
| #define EFI_BOOT_SCRIPT_PCI_CONFIG_WRITE_OPCODE | 0x04 |
| #define EFI_BOOT_SCRIPT_PCI_CONFIG_READ_WRITE_OPCODE | 0x05 |
| #define EFI_BOOT_SCRIPT_SMBUS_EXECUTE_OPCODE | 0x06 |
| #define EFI_BOOT_SCRIPT_STALL_OPCODE | 0x07 |
| #define EFI_BOOT_SCRIPT_DISPATCH_OPCODE | 0x08 |
| #define EFI_BOOT_SCRIPT_TABLE_OPCODE | 0xAA |
| #define EFI_BOOT_SCRIPT_TERMINATE_OPCODE | 0xFF |

These operations are defined such that the startup ACM in 218 or CPU hardware/microcode in processor core 100 can execute these operations prior to running any third party macrocode or BIOS. These may provide patches or workarounds in a chipset (whether it be portions of the chipset in a processor complex (e.g., "uncore") or a classical distributed chipset such as I/O complex in 108).

In some embodiments, one or more non-legacy processor event handler routines are in the firmware 102. These routines may include a non-legacy reset state handler routine 220, a non-legacy system management interrupt (SMI) entry state handler routine 222, and/or a non-legacy startup interprocessor interrupt (IPI) state handler routine 224.

The non-legacy reset state handler routine 220 includes a code flow capable of handling a system reset (soft or hard reboot) in the native mode (a non-legacy mode) that the system will boot the operating system (OS) to, rather than legacy 16-bit real mode. Thus, instead booting the system boot in legacy mode and requiring a transfer from legacy mode to the desired native mode the OS operates within, the native mode is used as the mode to handle the system reset.

The non-legacy SMI entry state handler routine 222 includes a code flow capable of handling an SMI in the native mode that the system will boot the OS to, rather than legacy mode. Again, instead of handling the SMI in legacy mode and requiring a transfer from legacy mode to native mode after an SMI occurs, the native mode is used as the mode to handle the SMI.

Finally, the non-legacy startup IPI state handler routine 224 includes a code flow capable of handling an IPI that occurs at least during system startup. Instead of transferring the system to legacy mode to handle the startup IPI and then transferring back to the native mode, the system remains in native mode to handle the startup IPI.

There are a number of embodiments that can be utilized to provide the system access to the non-legacy mode routines. In some embodiments, the non-legacy mode routines (220, 222, and 224) are stored in the firmware as a microcode patch in the microcode buffer. Thus, the processor, during boot, walks through the FIT 204, notices the microcode buffer pointer 208, jumps to the microcode buffer 216 and/or effects a "microcode patch" operation using the buffer as the patch location, and reads the non-legacy handler routines (220, 222, and 224) to handle one of the events specified in the routines.

In some embodiments, the non-legacy mode routines (220, 222, and 224) are stored in the startup ACM 218, which the processor manufacturer may implement. Thus, the processor, during boot, walks through the FIT 204, notices the startup ACM pointer 210, jumps to the startup ACM 218, and reads the non-legacy handler routines (220, 222, and 224) stored in the startup ACM 218 to handle one of the events specified in the routines. Notably, during boot, the processor would key on the non-legacy reset state handler routine 220.

In other embodiments, the non-legacy mode routines (220, 222, and 224) are stored in one or more non-legacy restart routine page tables 214. Thus, during a system restart (reboot), the processor walks through the FIT 204, notices the restart template pointer 212, and since the system has been restarted, the processor utilizes the non-legacy reset state handler routine 220.

In yet other embodiments, further pointers may be located in the microcode buffer 216 or the startup ACM 218 pointing to one or more of the non-legacy routines stored in the non-legacy startup routine page tables 214. For example, on a system reset, the processor may walk through the FIT 204, notice the startup ACM pointer 210, jump to the startup ACM 218, read an additional pointer in the startup ACM 218 that references a page table in the non-legacy startup routine page tables 214, and jump to the routine at the page table for handling. The startup ACM 218 can further look at additional table entries, such as the microcode in 208 or the boot-script in 2xx, and effect the microde patch operation using location in 208 as the operand and interpret/execute the boot script 226 entries, respectively.

In some embodiments, each time one of the processor events (e.g. reset, a SMI, or an IPI, among others) occurs, the processor goes through the entire walkthrough of one of the embodiments described above to reach the handler routine associated with the event. Although, in many other embodiments, for any event that is not a system reset, the processor may not require repeating all of the jumps to get to the handler routine. Specifically, in many embodiments, after the processor locates the set of non-legacy mode routines, a notifier is set which tells the processor that non-legacy handler routines for specific processor events are available. Thus, if an interrupt event occurs, the processor may have the routines, read previously during a reset event, resident in a location readily available for efficient handling.

For example, a specific location in the firmware (102 in FIG. 1) may be pre-designated for these routines and a non-legacy handler (NLH) notification (112 in FIG. 1) bit may be set in a register in the processor to notify the processor to look there because the bit was set during the initial routine walkthrough upon reset. In another embodiment, the NLH routines may be resident in a cache, in a memory device, or in a buffer that the processor is aware of so that the entire FIT 204 walkthrough is not necessary apart from a reset event.

Figure 3:
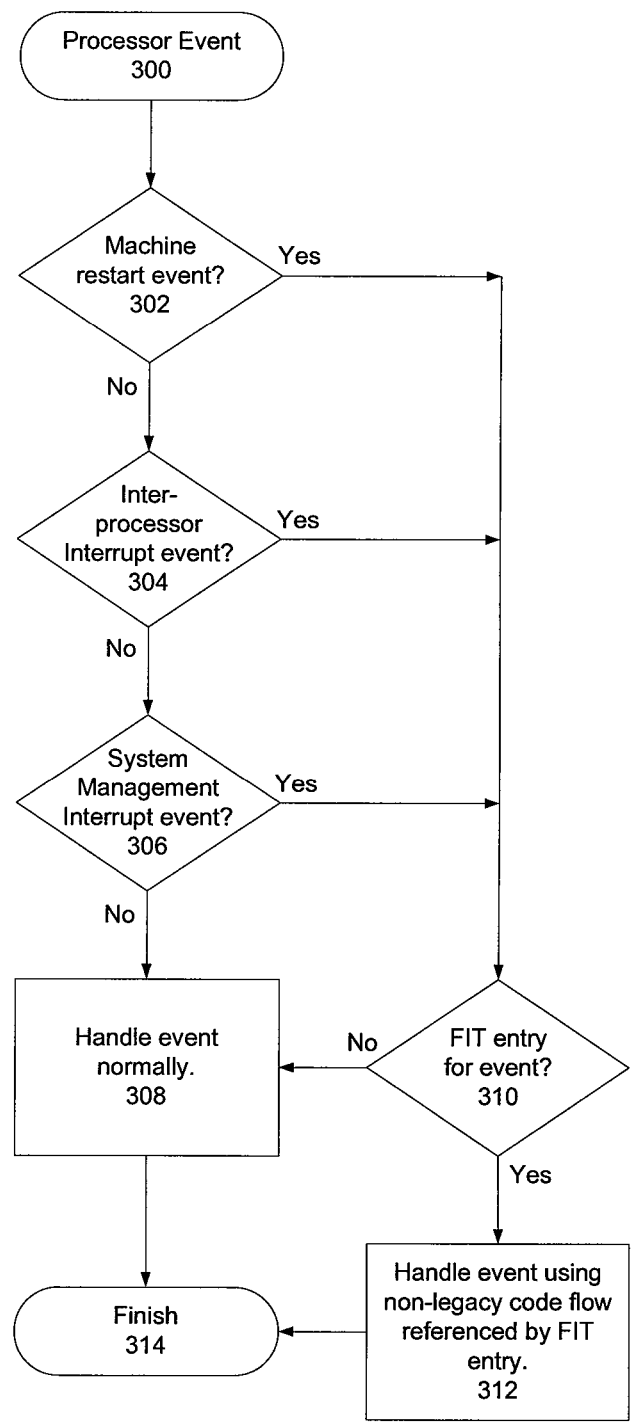
FIG. 3 is a flow diagram of one embodiment of a process to handle processor events in a non-legacy mode.

FIG. 3 is a flow diagram of one embodiment of a process to handle processor events in a non-legacy mode. The process may be performed by hardware, software, or a combination of both. The process begins by the occurrence of a processor event (processing block 300). Processing logic then determines whether the event is a machine restart event (processing block 302). If the event is a machine restart event, then processing logic determines whether there is a FIT entry for the event (processing block 310). If there is a FIT entry for the event, processing logic handles the event using a non-legacy code flow referenced by the FIT entry (processing block 312). In different embodiments, the non-legacy code flow is a routine stored within firmware that may be specifically located within a microcode patch, within a startup ACM, or within a ROM page table that includes non-legacy handling routines.

If there is no FIT entry for the event, then processing logic handles the event normally (processing block 308). In many embodiments, handling the event "normally" includes utilizing a legacy 16-bit real mode routine within BIOS that handles the event and turns the system over to the operating system in 16-bit real mode. As mentioned above, examples of these events can have handler routines include a system reset event, a SMI event, or a start IPI event.

Returning to block 302, if the event is not a system restart, then processing logic determines whether the event is an interprocessor interrupt event (e.g. a startup IPI event) (processing block 304). If the event is an interprocessor interrupt event, then processing logic proceeds to block 310 (discussed above).

Otherwise, if the event is not an interprocessor interrupt event, then processing logic determines whether the event is a system management interrupt event (processing block 306). If the event is a system management interrupt event, then processing logic proceeds to block 310 (discussed above). Otherwise, in the embodiment shown in FIG. 3, processing logic handles the event normally. In other embodiments not shown in FIG. 3, additional events (beyond a system reset, a startup IPI, or a SMI) may trigger a FIT entry search for potential non-legacy handling routines.

Once the event is handled, either normally, or through FIT-referenced non-legacy routines, the process is finished (processing block 314).

Figure 4:
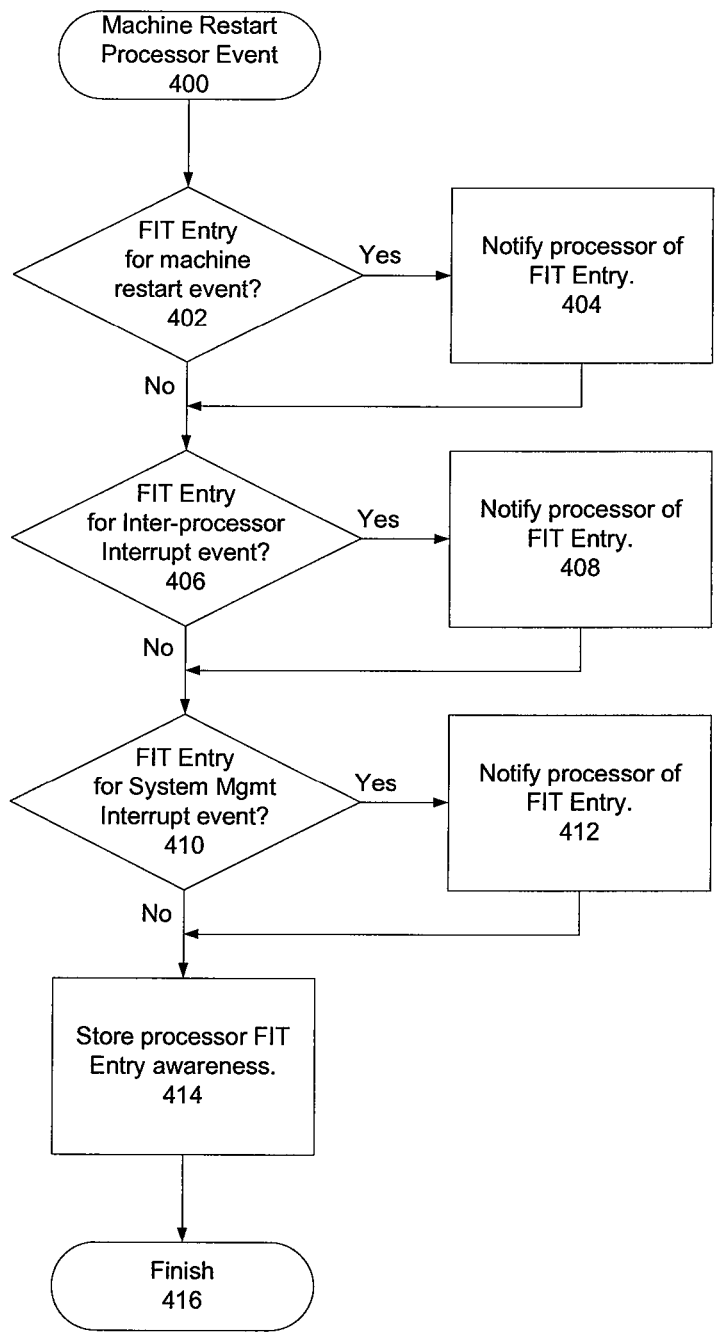
FIG. 4 is a flow diagram of one embodiment of a process to notify and store non-legacy FIT-referenced event handler routines for the processor.

FIG. 4 is a flow diagram of one embodiment of a process to notify and store non-legacy FIT-referenced event handler routines for the processor. The process may be performed by hardware, software, or a combination of both. The process begins by the occurrence of a machine restart processor event (processing block 400). Processing logic then determines whether there is a FIT entry for the machine restart event (processing block 402). If that entry exists, then processing logic notifies the processor of the FIT entry (processing block 404). This notification can comprise any one of a number of different notification processes as discussed above in reference to FIGS. 1 and 2, including the NLH notification 112 bit shown in FIG. 1. Other notification processes include the processor reading these one or more routines and leaving them resident in a cache, a memory device, or an internal buffer.

Then processing logic determines whether there is a FIT entry for an interprocessor interrupt event (processing block 406). If that entry exists, then processing logic notifies the processor of the FIT entry (processing block 408).

Then processing logic determines whether there is a FIT entry for a system management interrupt event (processing block 410). If that entry exists, then processing logic notifies the processor of the FIT entry (processing block 412).

Then processing logic stores the FIT entry awareness (processing block 414) and the process is finished (processing block 416). This awareness storage, as mentioned above, can take place in a register, memory, cache, or a buffer. Many different ways exist to keep the processor aware of the existence of these non-legacy processor event handler routines, the key result is that, absent another machine restart event (i.e. system reset event), the processor maintains knowledge of any additional FIT entries for other events such as the IPI and SMI events.

In many embodiments, if a FIT-referenced routine is found from the processes in FIGS. 3 and/or 4, the processor will then go through a code flow in the referenced non-legacy routine. During the execution of this code flow an error handling routine associated with the code flow may be present. The error handling routine may check to see if an error has occurred during the processor's execution of the non-legacy handling routine. If an error has occurred at any point during the non-legacy processor event handler routine execution, the processor may revert to real-mode handling of the processor event using the requisite 16-bit BIOS routine.

Thus, embodiments of a method, computer readable medium, and device to avoid real-mode BIOS routines are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
   in an x86 instruction set architecture environment of a system, after an event for a processor that triggers a 16-bit real mode processor handling routine within a basic input output system (BIOS), determining whether an entry exists in a firmware interface table of a firmware device, the firmware interface table to store pointers to locations within the firmware device, the entry to direct the processor to handle the event in a second mode, the second mode being a native mode other than 16-bit real mode; and
   the processor handling the event natively in the second mode, without a transfer to the 16-bit real mode for handling the event, when the entry exists, and thereafter handing the system to an operating system (OS) in the second mode.

2. The method of claim 1, further comprising:
   a microcode patch pointer in the firmware interface table redirecting the processor to a microcode routine to handle the event in the second mode.

3. The method of claim 2, further comprising:
running the microcode routine in the second mode prior to one or more third party macrocode routines.

4. The method of claim 1, further comprising:
a startup authenticated code module pointer in the firmware interface table redirecting the processor to an authenticated code module routine to handle the event in the second mode.

5. The method of claim 1, wherein the event comprises one of a system reset, an interprocessor interrupt, and a system management interrupt.

6. The method of claim 1, wherein the second mode comprises 64-bit long mode.

7. The method of claim 1, further comprising:
reverting to handling the event with the 16-bit real mode processor handling routine if the entry does not exist, and transferring the system to the OS in the 16-bit real mode.

8. The method of claim 1, further comprising:
reverting to handling the event with the 16-bit real mode processor handling routine if an error occurs during the processor handling the event in the second mode.

9. The method of claim 2, further comprising the microcode routine executing one or more boot script operations in the second mode.

10. The method of claim 1, further comprising:
after a system reset, determining whether a second mode handling routine exists for each of a system reset event, an interprocessor interrupt event, and a system management interrupt event; and
for each existing second mode handling routine, notifying the processor of the existence of the routine via a non-legacy handler notification bit of a register of the processor, wherein the processor remains notified of the existence of the routine until a next system reset.

11. A non-transitory computer readable medium having embodied thereon instructions, which when executed by a computer, performs a method comprising:
in an x86 instruction set architecture environment of a system, after an event for a processor that triggers a 16-bit real mode processor handling routine within a basic input output system (BIOS), determining whether an entry exists in a firmware interface table of a firmware device, the firmware interface table to store pointers to locations within the firmware device, the entry to allow the processor to handle the event in a 64-bit long mode; and
handling the event natively in the 64-bit long mode, without a transfer to the 16-bit real mode for handling the event, when the entry exists, and thereafter handing the computer to an operating system (OS) in the 64-bit long mode.

12. The computer readable medium of claim 11, wherein the performed method further comprises:
a microcode patch pointer in the firmware interface table redirecting the processor to a 64-bit long microcode routine to handle the event.

13. The computer readable medium of claim 11, wherein the performed method further comprises:
a startup authenticated code module pointer in the firmware interface table redirecting the processor to a 64-bit long mode authenticated code module routine to handle the event.

14. The computer readable medium of claim 11, wherein the performed method further comprises:
reverting to handling the event with the 16-bit real mode processor handling routine if the entry does not exist, and transferring the computer to the OS in the 16-bit real mode.

15. The computer readable medium of claim 11, wherein the performed method further comprises:
reverting to handling the event with the 16-bit real mode processor handling routine if an error occurs during the processor handling the event in the non-16-bit real mode.

16. A device, comprising:
an x86 instruction set architecture processor core;
a firmware interface table stored in a firmware device; and
entry point logic, wherein the entry point logic, after an event for the processor core that triggers a 16-bit real mode processor handling routine within a basic input output system (BIOS), is operable to:
determine whether an entry exists in the firmware interface table, the firmware interface table to store pointers to locations within the firmware device, the entry to allow the processor core to handle the event in a second mode, the second mode being a native mode other than 16-bit real mode; and
direct the processor core to handle the event natively in the second mode, without a transfer to the 16-bit real mode for handling the event, when the entry exists, and thereafter hand the device to an operating system (OS) in the second mode.

17. The device of claim 16, wherein the event comprises one of a system reset, an interprocessor interrupt, and a system management interrupt.

18. The device of claim 16, wherein the entry point logic is further operable to:
direct the processor core to revert to handling the event with the 16-bit real mode processor handling routine if the entry does not exist, and transfer the device to the OS in the 16-bit real mode.

19. The device of claim 16, wherein the entry point logic is further operable to:
direct the processor core to revert to handling the event with the 16-bit real mode processor handling routine if an error occurs while the event is being handled in the second mode.

20. The device of claim 16, wherein the entry point logic is further operable to:
after a system reset, determine whether a second mode handling routine exists for each of a system reset event, an interprocessor interrupt event, and a system management interrupt event; and
for each existing second mode handling routine, notify the processor core of the existence of the routine, wherein the processor core remains notified of the existence of the routine until a next system reset.

* * * * *